Patented Mar. 30, 1943

2,315,029

UNITED STATES PATENT OFFICE 2,315,029

WATER-REPELLENT SURFACING FOR CEMENT

Robert G. Wetton, Haddonfield, N. J., assignor to Keasbey & Mattison Company, Ambler, Pa., a corporation of Pennsylvania No Drawing. Application July 27, 1940,
Serial No. 348,017

8 Claims. (Cl. 106—243)

This invention relates to the provision of a water-repellent surface on structures and articles of Portland cement.

The object of the invention is to provide a water-repellent coating for cement surfaces, which is safe, efficient and inexpensive in manufacture and application and pleasing in appearance.

I have discovered that a water emulsion of an insoluble mixture having a waxy appearance and feel will deposit a lasting water-repellent film on the cement when flowed, sprayed or otherwise spread thereon and dried.

The mixture preferably comprises an insoluble metallic soap, a free fatty acid and an organic ester of a fatty acid. For instance, 40 parts of calcium stearate are melted together with 30 parts of stearic acid and 30 parts of butyl stearate and the melted mixture is run with continuous agitation into a boiling water solution (400 parts) of triethanolamine (5 parts) and potassium stearate (5 parts) until a uniform emulsion is formed. Then 1600 parts of water at lower temperature are added with continued agitation until all of the water is incorporated. The dilute emulsion at 100° to 120° F. will be reasonably stable.

The approximate ranges of the three components are 20 to 60 per cent calcium stearate, 10 to about 40 per cent butyl stearate, and 10 to 70 per cent stearic acid. Mixes containing more than 60 per cent calcium stearate are too viscous to emulsify readily, although the melting points are not all above 210°. Mixes containing above 40 per cent butyl stearate are too soft and some of the excess ester separates as a liquid phase.

The melting point of the 30.30–40 proportion is 165° F. The lowest practicable melting point would be about 120° and the highest below 200° F. for these ingredients. By melting point is meant the temperature at which the melted mix will begin to solidify upon cooling.

In applying the emulsion to the surfaces of asbestos cement siding, shingles, etc., for example, it is preferably flowed at about 120° F. over the surfaces warmed to 120° F. to 140° F. and the excess of the liquid is removed with an air spray. Dipping, spraying or other modes of application may be resorted to in bringing the emulsion to the surface of the cement. After application of the mixture the water is allowed to dry out and the surface is permitted to dry, leaving the strongly adherent film of the waxy ingredients to act as a water-repellent protection against subsequent wetting of the cement. Analysis indicates that there is a reaction between the emulsifying agent and the lime of the cement surface which breaks the emulsion and aids in rendering it permanently water-resistant. During emulsification where triethanolamine and stearic acid are present, there is a reaction between the triethanolamine and a portion of the stearic acid (two parts stearic acid per part of triethanolamine) which forms the soluble triethanolamine stearate ester or soap which is the actual emulsifying agent. This compound reacts with the lime of the cement surface forming calcium stearate. The potassium stearate, when added as in my preferred example, will also react forming calcium stearate so that the ratio of calcium stearate to the other ingredients in the final film will be slightly higher than in the original wax. There may also be a tendency for the lime of the cement surface to react with the free stearic acid and the butyl stearate, but such reactions will be extremely slow since the free acid and ester are relatively insoluble.

The mixture forming the film will have a high melting point well above temperatures met with in practice and not below 120° F. and its unctuous waxy nature will make it lastingly adherent and resistant to removal. At the same time it is soft enough not to crack or disintegrate and it will maintain its continuity so as to securely protect the entire surface coated. In water-repellent action it might be considered as though lining the pores of the cement surface so as to impart a negative capillarity.

The combination has desirable properties which are not possessed by any one or two of the components. Stearic acid and butyl stearate both act to produce a liquid composition that can be emulsified. Stearic acid alone would tend to reduce the melting point, but the waxes produced would be hard and would shrink and crack. Butyl stearate helps to keep the wax softer and more flexible. There are a whole series of desirable properties for the so-called wax at different steps in the process. It should preferably have a melting point below the boiling point of water and be liquid enough when melted to emulsify readily. Viscosity, stability and particle size of the emulsion will vary with the composition of the wax and the resulting coating on the cement surface will be satisfactory in appearance and in water-repellent action. It is durable and will not be attacked too rapidly by the weather and is flexible enough not to crack and fall apart. It is relatively homogeneous to prevent the separation of crystal or liquid phases.

In place of calcium stearate, aluminum stearate or other insoluble metallic stearate may be substituted and in fact any commercially available insoluble metallic soap or any other higher fatty acid or mixture of acids may be used in the waxy mixture, the calcium and aluminum stearates being particularly suitable for white compositions. Colored compositions may be developed by using colored soaps such as copper or chromium soaps for blue or blue-green coatings.

The organic ester of a fatty acid may be either a natural or synthetic product. It may contain a monohydric alcohol such as butyl or octyl alcohol or a polyhydric alcohol such as glycol or glycerine. The acid portion of the ester may consist of any long chain fatty acid or mixture of acids. There are a large number of natural products which fall in the organic ester class as well as a growing list of synthetic products. Castor oil (glyceride of ricinoleic acid) has been used as well as dehydrated castor oil as the organic ester in some tests. Other natural oils could be used except those tending to yellow. Esters derived from any monohydric alcohol from butyl with four carbon atoms to those with 15 or even more could be used if commercially available. Polyhydric alcohols such as glycerol or the glycols could be used.

Similarly any higher fatty acid, such as oleic or palmitic may be used in place of stearic acid, or a mixture of these acids may be employed. The series of aliphatic organic acids which correspond to the series of aliphatic hydrocarbons are commonly called fatty acids because the most common members are derived from natural fats. The long chain members of this series, i. e., those with more than six or eight carbon atoms, are designated as the higher fatty acids. The only acids of this group available on a commercial scale are those derived from natural fats or oils. Stearic, palmitic, and oleic are the most common.

The ingredients in the mixture are preferably in proportions giving a plastic waxy consistency within the usual temperature range to which the surfaces are exposed, and the melting point of the mixture is well above the highest temperatures to which the materials will be subjected in service and preferably so as to give a clear liquid at 212° F. for preparation of the emulsion at boiling temperature under atmospheric conditions.

210° F. would be suitable if the wax melted to a non-viscous liquid and special emulsifying machinery were available. Even higher melting mixtures could be used under autoclave conditions. With 120 lbs. per square inch pressure temperatures up to 350° are possible. However, temperatures above 300° will discolor many of these materials. It should be borne in mind that while it is conceivable to emulsify any mixture above its melting point, many of these compositions are extremely viscous, almost glassy, and could not be readily emulsified even at temperatures considerably above their melting points.

The proportions of the emulsifying agents may be varied and the potassium stearate may be omitted altogether. Other suitable emulsifying agents such as monoethanolamine, triisopropanolamine, diethylaminoethanol and similar compounds in suitable proportions may be used in place of the triethanolamine and the concentration of the emulsion can be varied widely and the emulsion itself may be applied hot or cold to hot or cold surfaces. The 20% emulsion as first formed is reasonably stable and might be used if it were possible to keep the entire system at about 200° F. Emulsions with about 50% solids might be formed but would be too stiff to use without dilution. Much thinner emulsions could also be used. If a dip method of application were employed, a one or two percent emulsion would probably be best.

An emulsion formed from a wax-like mixture made at least from two of the following ingredients: a metallic soap, an ester of higher fatty acid or acids, and free fatty acid will have some of the desirable properties of the mixture of all three ingredients. None of the two component mixes is as satisfactory as some of the three component mixes in the system, for instance, calcium stearate, stearic acid and butyl stearate.

The resulting film on the surface of the cement clings tenaciously and is very resistant and water-repellent. It may be provided in a wide variety of colors and is safe and convenient in preparation and application since it dispenses altogether with the use of organic solvents and highly volatile explosive and inflammable liquids.

I claim:

1. The method of forming liquid coating composition comprising providing a melted mixture of a metallic salt of a higher fatty acid and a lower alkyl ester of a higher fatty acid and a higher fatty acid having more than six carbon atoms, said ingredients being substantially insoluble in water, introducing said mixture into water heated to between 120° F. and 350° F. and containing emulsifying ingredients and agitating the mixture to form an emulsion.

2. The method as set forth in claim 1 in which the melted mixture is at a temperature less than 350° F. and above 120° F. and is introduced into water within said range, 120° F. to 350° F. or less.

3. The method as set forth in claim 1 in which triethanolamine is used as an emulsifying agent.

4. The combination with a body of porous cement of an adherent surface film thereon formed of a plurality of ingredients blended to give a homogeneous coating of plastic waxy consistency maintaining its continuity so as to protect the entire surface coated and comprising a mixture of a larger proportion of a water-repellent metallic soap of a higher fatty acid and a lesser proportion, 10 to 40%, of an organic ester of a higher fatty acid, said ester being derived from a monohydric or polyhydric alcohol with from two to approximately fifteen carbon atoms and said ingredients being substantially insoluble in water.

5. The combination as set forth in claim 4 in which the blend of the ingredients also contains a free higher fatty acid having more than six carbon atoms.

6. The combination as set forth in claim 4 in which the organic ester is derived from a monohydric alcohol with from four to fifteen carbon atoms.

7. A liquid coating composition adapted to deposit on a porous cement surface a water-repellent adherent film giving a homogeneous coating of plastic waxy consistency maintaining its continuity so as to protect the entire surface coated, comprising a water emulsion of a mixture of a metallic salt of a higher fatty acid in proportions substantially 20–60%, an organic ester of a higher fatty acid in proportions substantially 10 to about 40% and a higher fatty acid having more than six carbon atoms in proportion not exceeding 70%, said ester being derived from a monohydric or polyhydric alcohol with from two to approximately fifteen carbon atoms and said ingredients being substantially insoluble in water.

8. A liquid coating composition as set forth in claim 7 in which a small percentage of an emulsifying agent is added.

ROBERT G. WETTON.

CERTIFICATE OF CORRECTION.

Patent No. 2,315,029.

March 30, 1943.

ROBERT G. WETTON.

It is hereby certified that error appears in the printed specification of the above numbered patent requiring correction as follows: Page 1, second column, line 56, for "soap or" read --soap of--; page 2, second column, line 32, claim 2, for "350° F. or less" read --350° F.--; and that the said Letters Patent should be read with this correction therein that the same may conform to the record of the case in the Patent Office.

Signed and sealed this 25th day of May, A. D. 1943.

Henry Van Arsdale,
Acting Commissioner of Patents.

(Seal)